United States Patent [19]

Crowley et al.

[11] Patent Number: 4,525,786

[45] Date of Patent: Jun. 25, 1985

[54] ELECTRONIC POSTAGE METER HAVING A ONE TIME ACTUABLE OPERATING PROGRAM TO ENABLE SETTING OF CRITICAL ACCOUNTING REGISTERS TO PREDETERMINED VALUES

[75] Inventors: Raymond R. Crowley, Newtown; John H. Soderberg, Stratford, both of Conn.

[73] Assignee: Pitney Bowes Inc., Stamford, Conn.

[21] Appl. No.: 397,398

[22] Filed: Jul. 12, 1982

[51] Int. Cl.[3] ......................... G06F 3/00; G06F 15/00

[52] U.S. Cl. ..................................... 364/466; 364/900

[58] Field of Search ............... 364/466, 464, 900, 200; 235/101

[56] References Cited

U.S. PATENT DOCUMENTS

| | | | |
|---|---|---|---|
| 3,689,893 | 9/1972 | Taddei | 364/900 |
| 3,792,446 | 2/1974 | McFiggins et al. | 364/900 |
| 3,938,095 | 2/1976 | Check, Jr. et al. | 364/900 |
| 3,978,457 | 8/1976 | Check, Jr. et al. | 364/900 |
| 4,097,923 | 6/1978 | Eckert, Jr. et al. | 364/900 |
| 4,135,240 | 1/1979 | Ritchie | 364/200 |
| 4,251,874 | 2/1981 | Check, Jr. | 364/466 |
| 4,280,180 | 7/1981 | Eckert, Jr. et al. | 364/464 |
| 4,301,507 | 11/1981 | Soderberg et al. | 364/464 |
| 4,424,573 | 1/1984 | Eckert, Jr. et al. | 364/900 |

FOREIGN PATENT DOCUMENTS 0019515 5/1980 European Pat. Off. .

*Primary Examiner*—Jerry Smith
*Assistant Examiner*—Michael R. Fleming
*Attorney, Agent, or Firm*—David E. Pitchenik; Joseph A. Sawyer, Jr.; William D. Soltow, Jr.

[57] ABSTRACT

In order to allow manufacturing complete freedom in testing and to insure that a customer receives an electronic postage meter or electronic parcel register preset to known values, the meter is operable to preset the internal registers in the accounting module when a serial number is locked in the unit. The dollar values in the ascending and descending registers, and the unit piece count may be preset to any pre-determined value only once during the life of the nonvolatile memory device associated with the accounting module in an electronic postage meter or electronic register. The serial number lock is modified to enable the internal register modification to be provided. To minimize any unauthorized abuse, by an external stimulus or by an internal failure, the serial number lock is tested before each register value is preset. The serial number lock is set after the preset to bar unauthorized entry into this sensitive routine. If a set lock is detected during any of the tests, a non-recoverable fatal error is set in meter/register. Operation of the unit is prevented if this fatal error condition is detected during the power-on sequence of the meter or register.

14 Claims, 10 Drawing Figures

ELECTRONIC POSTAGE METER HAVING A ONE TIME ACTUABLE OPERATING PROGRAM TO ENABLE SETTING OF CRITICAL ACCOUNTING REGISTERS TO PREDETERMINED VALUES

FIELD OF THE INVENTION

The present invention relates to electronic postage meters, and more particularly, to an electronic postage meter of the type adapted to operate in a manner which facilitates manufacturing.

BACKGROUND OF THE INVENTION

Electronic postage meters have been developed which include both a non-volatile memory which stores critical accounting information during non-use or power down conditions of the meter and a volatile random access memory. Meters of this type are described, for example, in U.S. Pat. No. 3,978,457 for MICROCOMPUTERIZED ELECTRONIC POSTAGE METER SYSTEM and also in U.S. Pat. No. 4,301,507 for ELECTRONIC POSTAGE METER HAVING PLURAL COMPUTING SYSTEMS.

In meters of the above type, a firmware module, a read only memory, has a program which controls the operation of the postage meter. During operation of the meter, current operating information is written into a volatile random access memory. The information in the volatile random access memory is transferred to the non-volatile memory during a power down condition, as when the meter power switch is turned off and writes in the non-volatile memory with the updated data. When the meter is turned on again during a power up condition, the image of the data in the non-volatile memory is copied or written into the meter's volatile random access memory. As the meter is operated, the data in the volatile random access memory is modified in accordance with the usage. The critical accounting information stored in non-volatile memory may include, by way of example, the amount of postage remaining in the meter for subsequent printing (a descending register) and the total amount of postage printed by the meter (an ascending register). Other types of accounting or operating data may also be stored in the non-volatile memory. Examples of such other data may include a piece count register and a control sum register (the sum of the ascending and descending registers). The function served by the non-volatile memory circuits have replaced and enhanced the functions of the mechanical accounting registers or wheels utilized in previous mechanical meters.

In manufacturing meters of this type, the non-volatile memory which will contain the critical accounting information and operating data is secured in a tamper resistant housing. This housing includes various security measures, such as teltales and break-off screws, to insure that access to the non-volatile memory other and internal components cannot be achieved without leaving evidence of tampering. Accordingly, after the meter is assembled and when the meter is tested, if for any reason the register values are not proper or have values in them that are not desired, for example, due to testing, the only way that the non-volatile memory can be physically accessed is by taking apart the meter, which is a costly and time consuming process. Moreover, in certain countries outside the United States the problem is compounded since it is the practice to turn meters over to the postal authorities for testing with the meter's registers set to a non-initial number. The postal authorities test meters and run the registers from their non-initial number to a required (initial) reading before the meters are put in actual field service.

SUMMARY OF THE INVENTION

Unlimited testing of the non-volatile memory and meter is allowed with a routine being incorporated in the meter, which is a one-time usable routine, to preset the critical accounting registers to a predetermined condition, such as zero or even a negative or positive reading, as the last phase of the manufacturing operation. The one-time usable routine may also function so that the routine sets the registers to a negative or positive number for those countries where it is desired. The postal authorities or the manufacturing facility can actuate the one-time usable routine to zeroize the meter's registers after testing in the event the testing runs the registers above/or below a zero value. It is critical since an operating program is included in the meter which will allow the accounting registers of the meter to be preset to a predetermined condition contained in the firmware read only memory module of the meter, that provision must be made to insure that the register preset routine is not inadvertently or intentionally entered once the meter is put into service or the user may lose monetary information stored in the meter.

In accordance with the feature of the invention, a repetitive self-checking mechanism is provided to determine whether or not the register preset routine has been previously actuated to prevent the meter from completing a register preset operation to change the critical data in the accounting registers even if the routine is entered after the meter is put into service. If the routine is entered inadvertently, for example, because of a noise pulse or component failure which causes an improper microprocessor jump to a location in the firmware module which contains this program, the meter will be caused to be put into a fatal error condition. This disables the meter from further operation and a special code is written from a register in the volatile random access memory provided for receiving such diagnostic information into a corresponding register in non-volatile memory upon power down of the meter.

BRIEF DESCRIPTION OF THE DRAWINGS

Reference is now made to the drawings wherein like reference numerals designate similar elements in the various views.

DETAILED DESCRIPTION

Figure 1:
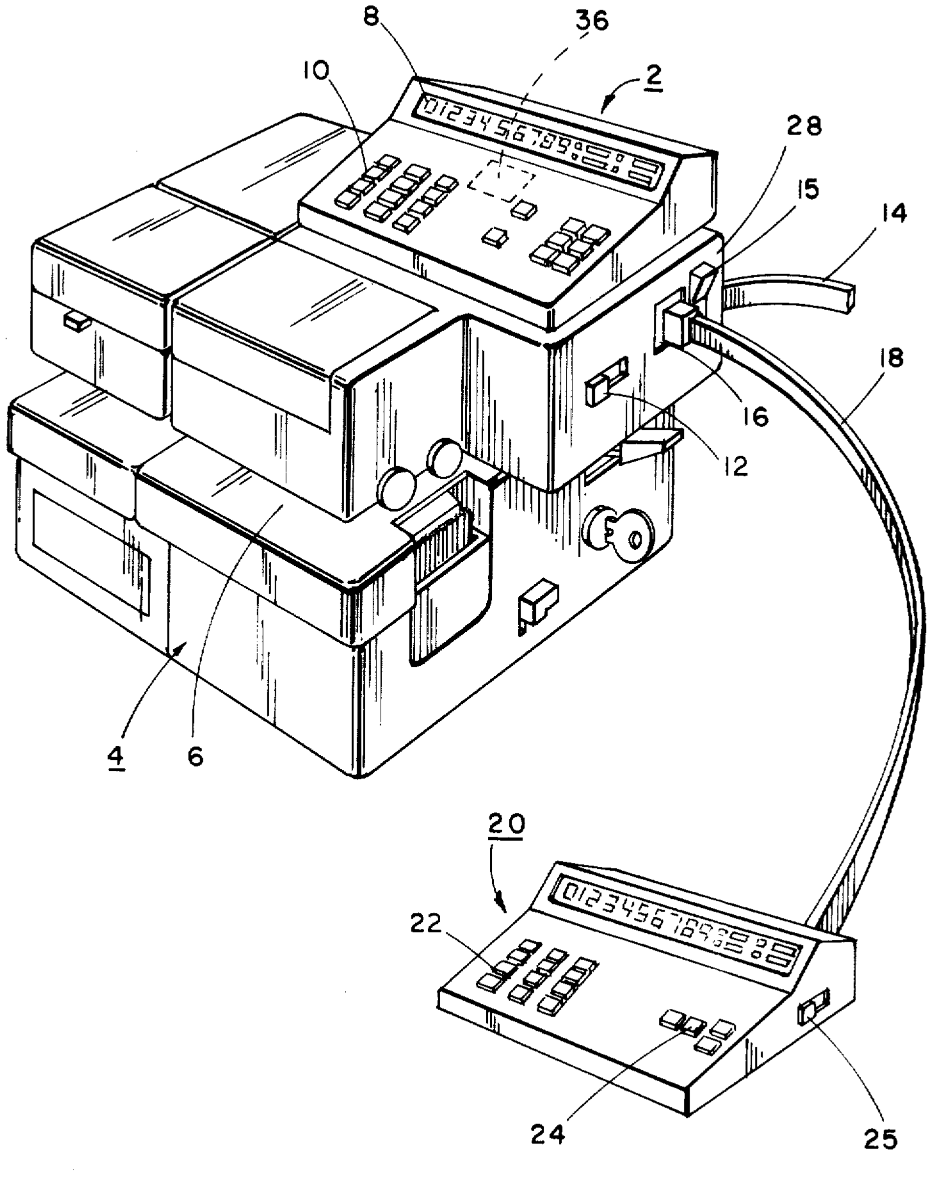
FIG. 1 is a perspective view of an electronic postage meter adapted to utilize the present invention.

Reference is now made to FIG. 1. FIG. 1 is a perspective view of a postage meter adapted to utilize the present invention. An electronic postage meter 2 is removably secured to a postage meter base 4. In this arrangement, a slot 6 is provided between the postage meter 2 and the base 4 at the forward edge thereof, for receiving envelopes or the like for the printing of postage thereon. The postage meter is provided with a display panel 8, preferably an electronic display device, as well as a control panel or keyboard 10.

The meter 2 includes a service mode switch 12. Power is applied to the meter 2 via an AC power line cord 14 when the meter power switch 15 is turned on. The meter also includes a communications port 16 which is connected by a communications cable 18 to an external message generator 20. The message generator is removable from the meter by detaching the cable 18 from the communications port 16. Communications between the meter 2 and the external message generator 20 may be in accordance with the serial communication echoplex technique described in U.S. Pat. No. 4,301,507 for ELECTRONIC POSTAGE METER HAVING PLURAL COMPUTING SYSTEMS.

As will be explained in greater detail hereinafter, the operation of the keyboard 10 of the electronic postage meter 2 differs from that of the keyboard 22 of the external message generator 20. The external message generator keyboard 22, with its unique keys 24 can invoke a routine in a read only memory in the external message generator 20 to generate a message with a unique header and format suitable to invoke a particular function in the electronic postage meter 2. That is, the keyboard 24 of the external message generator 20 can cause a message to be generated by the external message generator and communicated over communications channel 18 to the meter to invoke a routine stored in the read only memory (ROM) of the electronic meter 2 which cannot be invoked by actuation of the meter keyboard 10. The routine is used to preset critical accounting and other data adapted to be stored, as explained in greater detail in non-volatile memory 36. The non-volatile memory 36 is secured within the tamper resistant housing 28 of the meter 2. Housing 28 is of the type which protects the meter electronics, including non-volatile memory 26, against the effect of electromagnetic radiation. The housing 28 is also tamper resistant and designed to leave evidence by teltales and the like of attempt to gain access to the interior of the meter housing.

Figure 2:
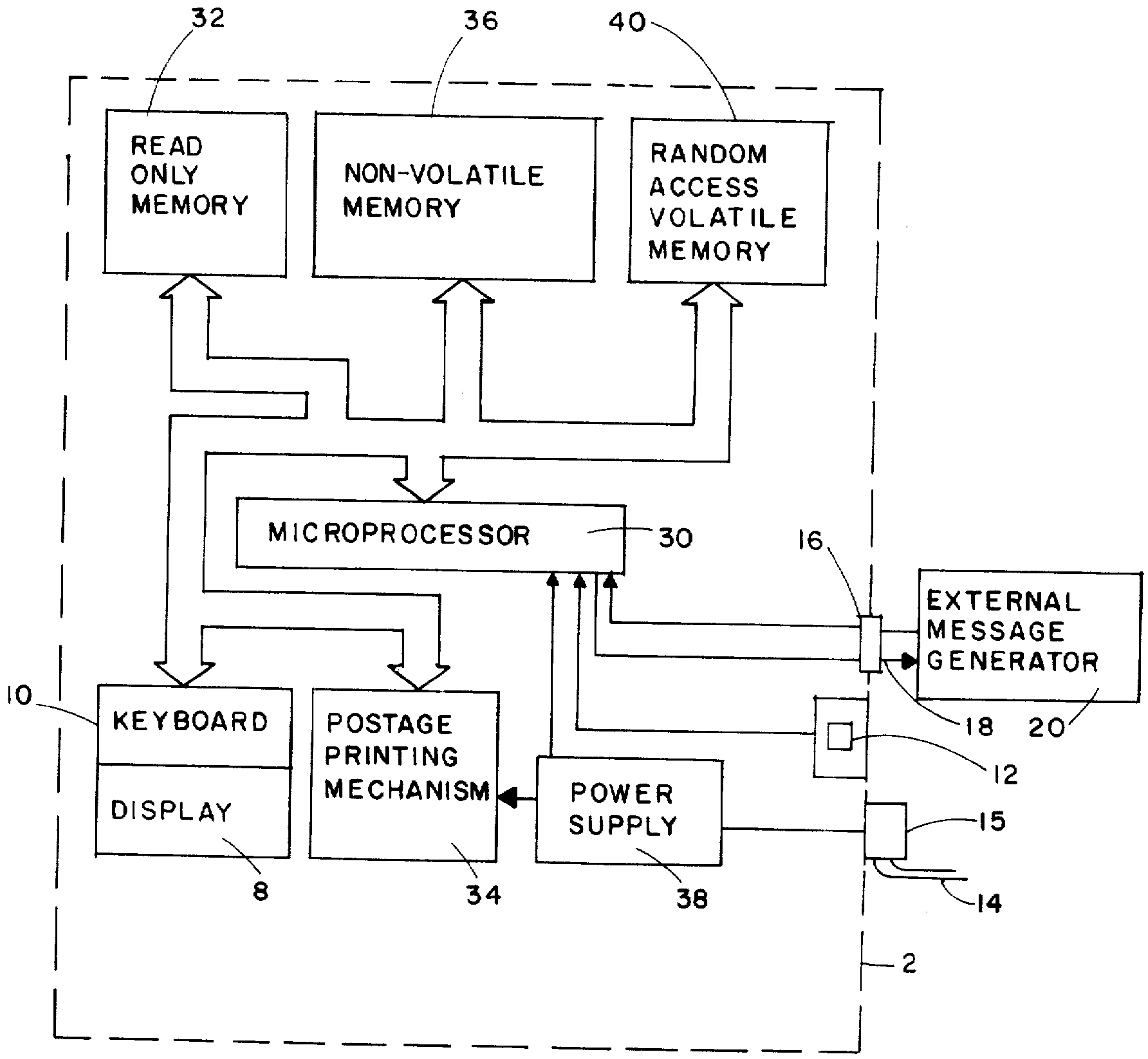
FIG. 2 is a block diagram showing one arrangement of the internal major components of an electronic postage meter embodying the present invention.

Reference is now made to FIG. 2 which is a block diagram showing one arrangement of the internal major components of an electronic meter embodying the present invention. The electronic postage meter 2 is controlled by a microprocessor 30 operated under control of a series of programs stored in a read only memory 32. Connected to the microprocessor are the keyboard 10 and display 8 as well as a postage printing mechanism 34. The microprocessor accepts information entered via the keyboard or via the communications port 16 from an external message generator, such as information entered from the external message generator 20 over the communications channel 18. Critical accounting and other information is stored in a non-volatile memory 36. The non-volatile memory 36 may be an MNOS semiconductor type memory, a battery augmented CMOS memory, or other suitable non-volatile memory component. The function of the non-volatile memory is to store critical postage meter data during those times when the power is not applied to the meter. This data may include, in addition to the serial number of the meter, information as to the amount of the descending register (the amount of postage available for printing), the value of the ascending register (the total amount of postage printed by the meter), and the value of the piece count register (the total number of cycles the meter has performed), as well as other types of data, such as service information, which are desired to be retained in the memory when no power is applied to the meter.

When the meter power switch 15 is turned on causing the power supply 38 internal to the meter to energize the microprocessor 30 and the postage printing mechanism 34, the information stored in the non-volatile memory is transferred via the microprocessor 30 to a volatile random access memory 40. The volatile, random access memory 40 after power up contains an image or copy of the information stored in the non-volatile memory 36 prior to energization. During operation of the postage meter, the data in the volatile, random access memory 40 is modified. Accordingly, when postage is printed, the descending register will be decremented, ascending register incremented and the piece counter register incremented. When the power switch 15 is turned off, the modified image, the current updated data in the volatile, random access memory is transferred via the microprocessor 30 back into the non-volatile memory 36. The data is transferred into a suitably prepared area of the non-volatile memory. Thus, the non-volatile memory is updated during the power down cycle when the power switch 15 is turned off. A like transfer of information between the non-volatile memory and the volatile, random access memory also occurs when the service mode switch 12 is actuated.

It should be noted that the external message generator 20 contains keys for generating special messages for transmittal to the meter via a serial echoplex communications channel 18 to the microprocessor 30. The external message generator includes unique keys 24 not found in the postage meter keyboard to enable the generation of a particular unique header message which is not generatorable in the meter keyboard itself. Among these are keys, which also may include a service lock switch 25, provided to send, enter serial number mode message, and exit serial number mode messages. Also included are keys to send a special enter serial number message. When desired, after the meter has entered the service mode, the external message generator 20 will send an enter serial number lock message as described in U.S. patent application, Ser. No. 355,437, filed Mar. 8, 1982 for IMPROVED NON-VOLATILE MEMORY SERIAL NUMBER LOCK FOR ELECTRONIC POSTAGE METER of John H. Soderberg and Edward C. Duwel, and assigned to Pitney Bowes Inc. This serial number lock message is designed to trigger the meter to operate under control of a special one-time usable firmware program to preset the accounting and other registers. A unique portion of the external message generator is that the keys to generate the messages provide unique headers and construct unique messages that cannot be generated in the meter 2 itself by actuation of the meter keyboard. Therefore, the messages to invoke the preset register routine stored in the meter firmware module are unique to the external message generator and cannot be duplicated in the meter keyboard or its switches. The external message generator 20, thus, has a unique program to generate the predetermined header, format and data which the meter is programmed to utilize. However, the meter 2 itself does not contain a program to allow generation of the same header, format and data by manipulation of the meter keyboard.

Figure 3A:
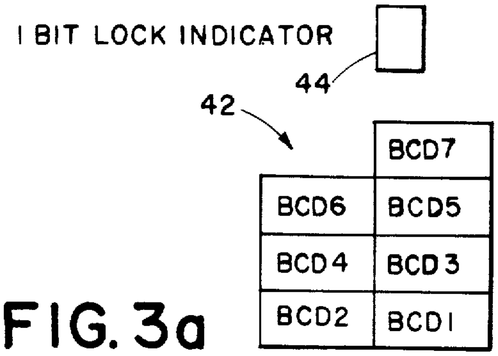
FIGS. 3A-D are partial memory maps of the non-volatile memory shown in FIG. 2 depicting the bit lock indicator and serial number locations as well as the locations and organizations of the critical accouning registers controlled by the one-time usable register preset routine used to preset these registers to predetermined values.

Reference is now made to FIG. 3A. Contained in the non-volatile memory 36 of the meter are seven nibles 42 which are reserved for the serial number. Also contained in non-volatile memory is an additional bit position 44 which is reserved for the lock indicator. The placement of the serial number is shown by the indicators of the binary coded digit, where BCD 7 is the most significant digit of the serial number and BCD 1 is the least significant digit.

When the service mode of the meter is entered via an external message, the firmware logic of the meter causes the non-volatile memory 36 to be prepared to have new or modified service data written into the non-volatile memory. The service field contains the serial number location. It should be recognized that when the present invention is utilized with electronic postage meters of the type shown in U.S. Pat. No. 4,301,507 for ELECTRONIC POSTAGE METER HAVING PLURAL COMPUTING SYSTEMS, the service mode switch described therein, as well as in U.S. Pat. No. 4,280,180 for ELECTRONIC POSTAGE METER HAVING FIELD SETTABLE CONTROL VALUES, is left in the operational mode as opposed to the service mode. This causes the external communications channel to remain operative. The entry into the service routine is achieved by the transmission of a service routine message from the external message generator 20.

It should be recognized that the purpose of the description of present invention, the meter is of the type wherein the information from non-volatile memory 36 is read during power up of the meter (when the meter power switch 15 is turned ON) and transferred back to non-volatile memory during the change from the operational to the service mode of the meter (when the meter service switch is moved from the operational to the service position). At all other times, a current copy or image of this information is in the volatile, random access memory 40 of the meter. Changes are made to the image of the information in the volatile random access memory 40. During the power down of the meter (when the meter power switch 15 is turned OFF) or mode change (service to operate or operate to service), the information in the volatile random access memory 40 is written into the non-volatile memory 36.

Figure 3B:
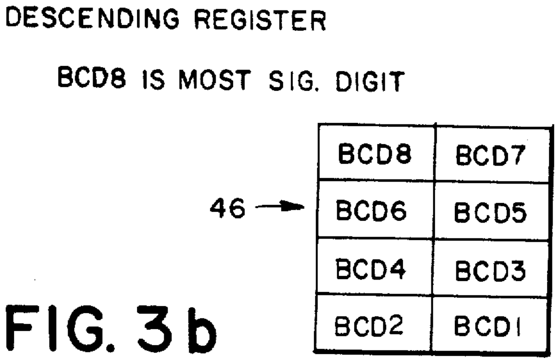

FIG. 3B depicts the memory map 46 of the portion of the non-volatile memory dedicated to the descending register information. The descending register is a resettable register which is adapted to store the amount of postage available for printing by the meter. As the postage is printed, the descending register image in the volatile, random access memory is decreased in accordance with the amount of printed postage. Upon power down of the meter, this information is written into the non-volatile memory 36 descending register location as new information replacing the previous information stored in that location. The value stored in the descending register may be increased with representations of added funds when the meter is recharged i.e., when additional postage value available for printing is entered into the meter.

Figure 3C:
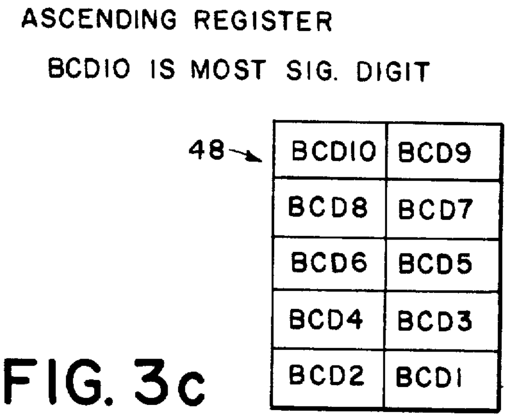

Reference is now made to FIG. 3C. FIG. 3C shows a memory map 48 of the non-volatile memory portion dedicated to storing information concerning ascending register amounts. The ascending register records the total amount of postage printed by the meter and is continually incremented throughout the life of the meter. This register is non-resettable.

Figure 3D:
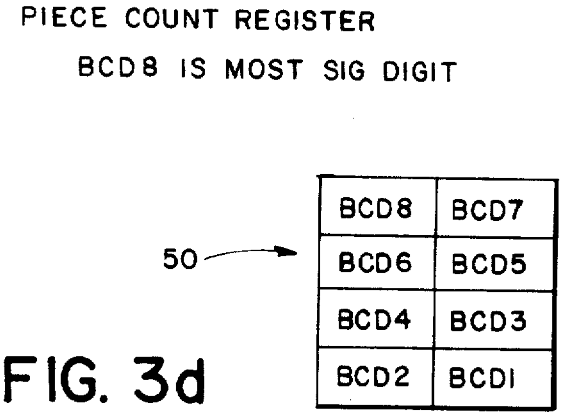

Reference is now made to FIG. 3D. FIG. 3D shows a non-volatile memory map 50 of the piece count register. The piece count register is a register which is non-resettable and maintains a count of the number of cycle of the meter. This register works in a similar manner to that described above in connection with the descending register.

The ascending, descending and piece count registers are the three registers which are set to the predetermined value upon the receipt of the serial number lock message from the external message generator.

Figure 4:
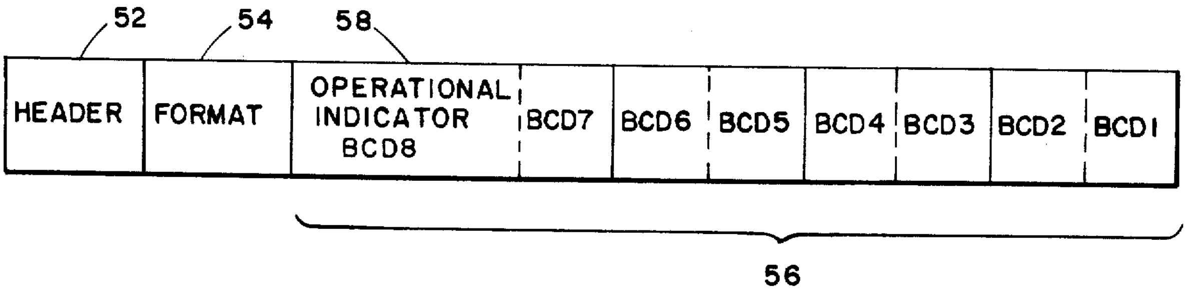
FIG. 4 is a diagrammatic representation of a serial number message including an operational indicator BCD bit digit.

Reference is now made to FIG. 4. The enter serial number message consists of a one byte (eight bits) header or identifier 52, a format byte 54 and four data bytes 56 for a total of six bytes. Contained in the four data bytes 56 are a BCD operational indicator and seven binary coded digits, two per byte, representing the serial number. Header 52, format 54 and data bytes 56 are as generally described in the aforementioned U.S. Pat. No. 4,301,507. The header 52 provides identification of the unique message that is to follow, here, the fact that the message constitutes the serial number. The format byte 54 contains two BCD digits indicating the number of data digits to follow and the placement of the decimal point within these digits. In its present case of the serial number, there is no decimal point, therefore, the decimal point position indicator will be shown as containing four ones or a hex F in decimal point indicator position.

The operational indicator BCD digit 58 indicates to the meter operating under the control of the firmware program contained in the read only memory 32 which operation, a change in the serial number or lock, the serial number is to be performed. A zero will indicate a desire to change the serial number and a one will indicate a desire to lock the serial number. Codes 2 HEX thru F HEX of the operational indicator are undefined and will cause the meter to return a procedural error message.

Figures 5, 5A:
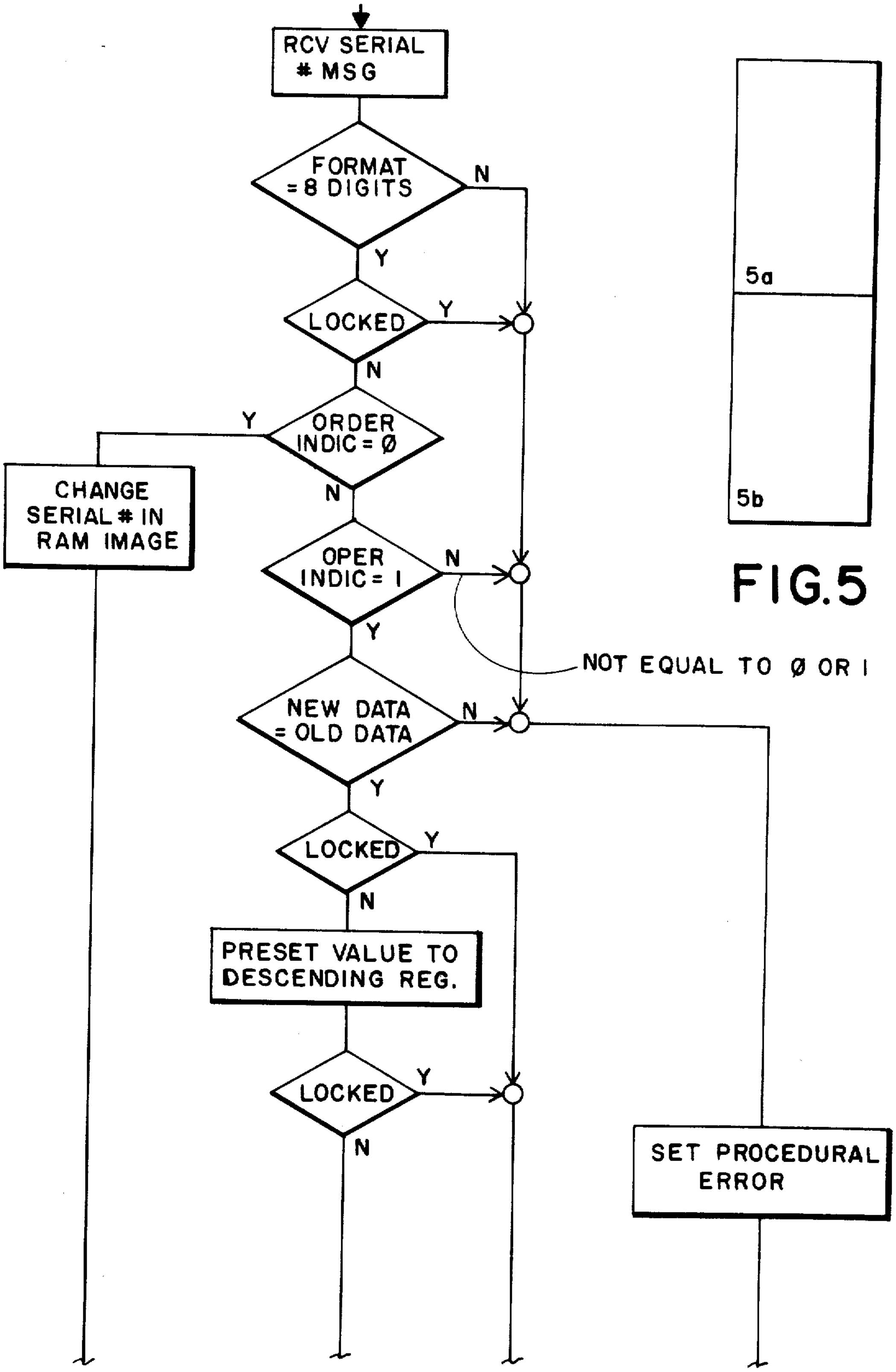
FIGS. 5*a* and 5*b* when taken together are a flow chart of the firmware program of the read only memory shown in FIG. 2 which enables preset of critical accounting registers upon entry of a serial number lock message and including protection against inadvertent entry into the register preset routine.
Figure 5B:
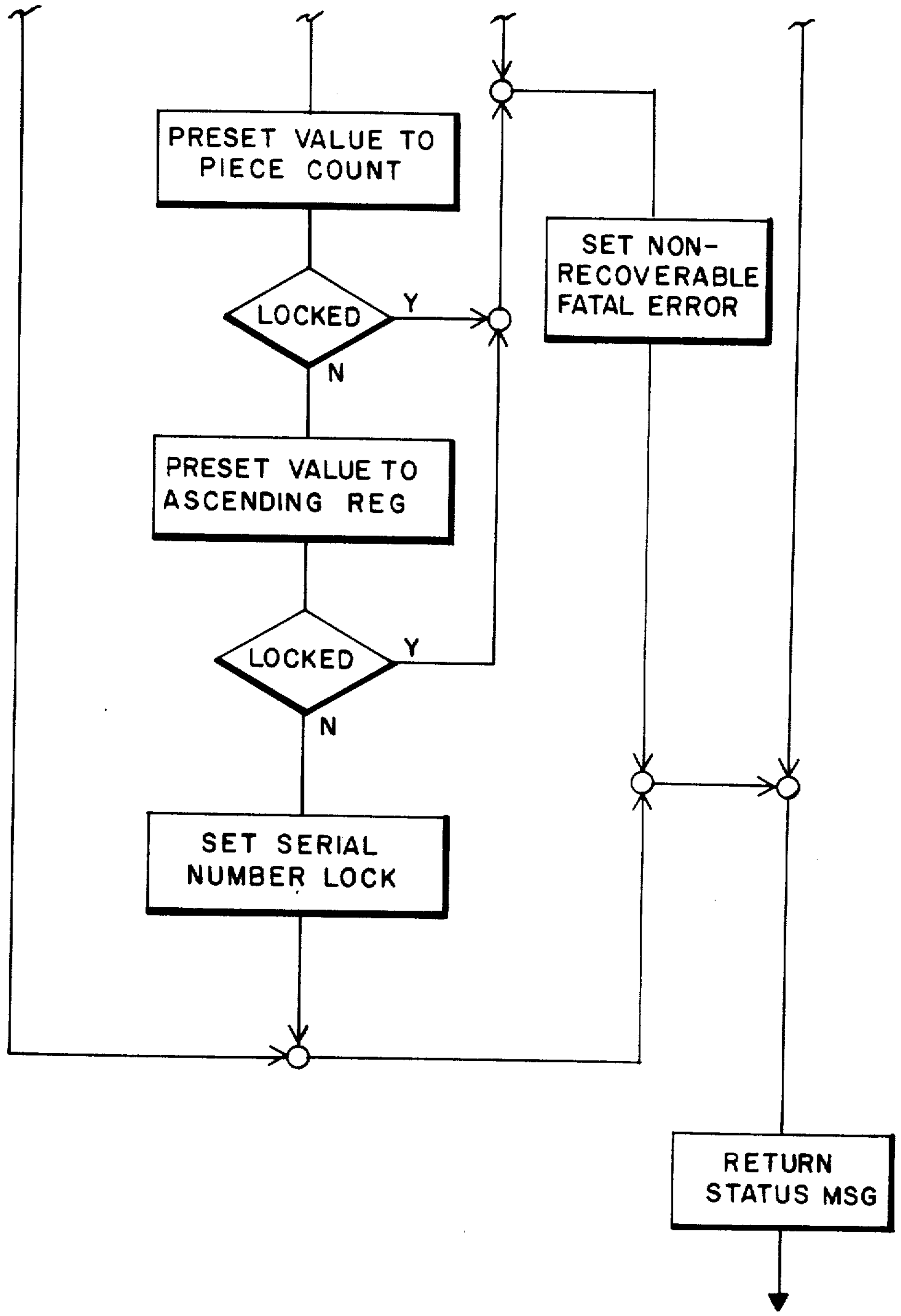

Reference is now made to FIG. 5. A message received from the external device enters the serial number into the meter. The serial number message is first checked for the correct number of digits in the message. If eight digits are not present in the serial number field, a procedural error message is generated which causes a status message to be returned to the external message generator. If the format is correct, the non-volatile memory serial number lock-bit position is then checked. If the bit is set, a procedural error message is generated. If the bit is not set, the operational indicator bit in the message is then checked to determine whether it is set to a zero or a one. If the bit is set to a zero, the serial number in the volatile, random access memory image is changed. However, if the operational indicator bit is set to a one, the operational indicator bit is again checked to insure that the value was correctly read and is in fact a one. If the value is one, the program proceeds. However, if upon this check it is determined that the value is not one, a procedural error message is generated and a status message is returned to the external message generator.

If the operational indicator bit is set to one, a comparison is made between the new serial number data and the old serial number data. If the data is not the same, a procedural error message is generated and a status message is returned to the external message generator. However, if the comparison indicates that the two serial numbers are identical, the lock indicator bit is tested to determine whether it has been set. If the bit has been set, a fatal error message is generated. This fatal error is non-recoverable and the meter is caused to lock up. The meter remains inoperative and must be taken out of service and returned for repair or service. Once the fatal error message is generated and the meter locked up, a user cannot render the machine operative. It should be noted that electronic postage meter procedural errors which can be overcome by reinitialization of the meter of fatal errors which will cause the meter to become inoperative and lock up are described in pending U.S. patent application Ser. No. 225,571, filed Jan. 16, 1981, for ELECTRONIC POSTAL METER SYSTEM and assigned to Pitney Bowes Inc. and in U.S. Pat. No. 4,251,874 for ELECTRONIC POSTAL METER SYSTEM.

If however, the lock indicator bit has not been set, then a predetermined value programmed into the meter's read only memory is used to preset the descending register. This value may be zero or some other determined value which is programmed into the read only memory. After this operation is completed, the serial number lock bit is then again tested to determine whether or not it has been set. If the lock bit has been determined as being set, a fatal error is generated. But, if the bit has not been set as determined by this test, a predetermined value programmed into the meter's read only memory is used to preset the piece counter. Again, similar to the descending register, the value can be zero or any predetermined value programmed into the read only memory. In a similar manner, the serial number lock bit is checked prior to sending a preset value to the ascending register. As the last operation, the serial number lock bit is again checked. If the bit is set, as before, a fatal error message is generated, but if the lock bit has not been set, the lock bit is then set and the serial number is locked into place and additionally, re-entry into the preset register program is precluded.

It should be noted that as a feature of the present invention, before setting the value of any of the critical registers to the preset amount, the serial number lock bit is tested to determine that it has not been set. Thus, should the program be entered due to a noise pulse or other reason, the meter would be caused to generate a fatal error message, causing the meter to lock up and requiring it to be removed from service for repair.

What is claimed is:

1. A postage meter, comprising:

printing means for printing postage;

a computing means coupled to said printing means for accounting for postage printed by said printing means;

non-volatile memory means coupled to said computing means, said non-volatile memory including memory locations for storing critical meter accounting data;

a program stored coupled to said computing means and adapted to store programs to control the operation of said computing means; and said program store containing a one-time actuable program operable to cause said computing means to write predetermined data into said non-volatile memory locations for storing critical accounting data such that said critical accounting data is set to predetermined values, and said program store further operable to prevent said computing means from reentering said program for writing said predetermined data into said non-volatile memory if said non-volatile memory locations have been previously set to said predetermined values.

2. A postage meter as defined in claim 1 wherein said program store contains a program which will cause the postage meter to generate a fatal error message which will lock the postage meter to become inoperative if said program for setting said non-volatile memory locations to a predetermined values is entered and said memory locations have been previously set to a predetermined values.

3. A postage meter, comprising:

printing means for printing postage;

a computing means coupled to said printing means for accounting for postage printed by said printing means;

non-volatile memory means coupled to said computing means;

said non-volatile memory having a register location adapted to store a meter serial number and a register location adapted to store a lock bit for preventing change of data in said serial number register location when said lock bit is set, said non-volatile memory further having register locations adapted to store data;

a program store coupled to said computing means and adapted to store programs to control the operation of said computing means; and said program store containing a one-time actuable program operable to cause said computing means to preset said data register locations in said non-volatile memory means only when said serial number is not set indicating an ability to change the serial number in said meter.

4. A postage meter as defined in claim 3 wherein said program store contains a program which will cause the postage meter to generate a fatal error message which will lock the postage meter to become inoperative if an attempt is made to preset register locations in said meter and the serial number lock has been previously set.

5. A meter as defined in claim 4 wherein said presettable data register locations include a descending register for storing data representing postage available for printing.

6. A meter as defined in claim 4 wherein said presettable data register locations include an ascending register for storing data representing the total postage printed by said meter.

7. A meter as defined in claim 6 wherein said presettable data register locations include a piece count register for storing data representing the number of meter operating cycles.

8. A meter as defined in claim 4 where said presettable data register locations include a descending register for storing data representing postage available for printing, an ascending register for storing data representing the total postage printed by the meter, and a piece count register for storing data representing the number of meter operating cycles.

9. A postage meter, comprising:

printing means for printing postage;

a computing means coupled to said printing means for accounting for postage printed by said printing means;

non-volatile memory means coupled to said computing means;

said non-volatile memory means having a register location to store a meter serial number and a register location adapted to store a lock bit for preventing change of data in said serial number register location when said lock bit is set, said non-volatile memory further having register location adapted to store data;

a program store coupled to said computing means and adapted to store programs to control the operation of said computing means; and said program store containing a program operable to set said data non-volatile memory register locations to predetermined values, said program further operable to prevent said computing means from presetting said data register locations in said non-volatile memory when said serial number is set.

10. A postage meter as defined in claim 9 wherein said program store contains a program which will cause the postage meter to generate a fatal error message which will lock the postage meter to become inoperative if an attempt is made to preset said data registers in said meter and the serial number lock has been previously set.

11. A meter as defined in claim 10 wherein said presettable data registers include a descending register for storing data representing postage available for printing.

12. A meter as defined in claim 10 wherein said presettable data register includes an ascending register for storing data representing the total postage printed by said meter.

13. A meter as defined in claim 12 wherein said presettable data register includes a piece count register for storing data representing the number of meter operating cycles.

14. A meter as defined in claim 10 where said presettable data registers include a descending register for storing data representing postage available for printing, an ascending register for storing data representing the total postage printed by the meter, and a piece count register for storing data representing the number of meter operating cycles.

* * * * *